United States Patent [19]

Nuij et al.

[11] Patent Number: 5,284,435
[45] Date of Patent: Feb. 8, 1994

[54] APPARATUS FOR MANUFACTURING A DISC-SHAPED INFORMATION CARRIER

[75] Inventors: Pieter W. J. M. Nuij, Farum, Denmark; Peter P. W. L. van den Bekerom, Eindhoven; Evert-Jan Mulder, 's Hertogenbosch, both of Netherlands

[73] Assignee: U.S. Philips Corporation, New York, N.Y.

[21] Appl. No.: 959,817

[22] Filed: Nov. 23, 1992

Related U.S. Application Data

[62] Division of Ser. No. 839,016, Feb. 18, 1992.

[30] Foreign Application Priority Data

Feb. 28, 1991 [NL] Netherlands ............... 9100366

[51] Int. Cl.⁵ .............................................. B29C 59/02
[52] U.S. Cl. ......................................... 425/385; 264/107; 425/394; 425/396; 425/810
[58] Field of Search ............. 264/106, 107; 425/385, 425/394, 396, 400, 810

[56] References Cited

U.S. PATENT DOCUMENTS

| | | | |
|---|---|---|---|
| 4,302,175 | 11/1981 | McNeely | 425/385 |
| 4,312,823 | 1/1982 | Kraakman et al. | 425/810 |
| 4,315,723 | 2/1982 | Antoine et al. | 425/810 |
| 4,783,041 | 11/1988 | Sakaida et al. | 425/810 |
| 4,954,841 | 9/1990 | Ichihara et al. | 369/275.1 |
| 5,174,937 | 12/1992 | Tamura et al. | 425/810 |
| 5,180,595 | 1/1993 | Kinoshita | 425/810 |

*Primary Examiner*—Charles S. Bushey
*Attorney, Agent, or Firm*—Norman N. Spain

[57] ABSTRACT

An apparatus for manufacturing an object having a relief structure on a surface thereof by pressing a first element provided with a negative of the relief structure against a second element to form the relief structure in the surface of the second element. The apparatus includes the first element and two pressure members having pressure surfaces facing each other and opposing both of the elements, the pressure members being moveable relative to each other in a direction transverse to the pressure surfaces. The apparatus also has a pressure body secured to the pressure surface of at least one of the pressure member, having a contact surface for cooperation with one of the elements and being formed of a material whose quotient of its Poissons' ratio to its modules of elasticity differs less from the corresponding quotient of the material of the element cooperating with said contact surface in operation than from the corresponding quotient of the material of the pressure member to which the pressure body is secured.

12 Claims, 2 Drawing Sheets

APPARATUS FOR MANUFACTURING A DISC-SHAPED INFORMATION CARRIER

This is a division of application Ser. No. 07/839,016, filed Feb. 18, 1992 pending.

BACKGROUND OF THE INVENTION

The invention relates to a method of manufacturing an object having a surface structure, the method employing pressure members which are movable relative to one another and which have facing pressure surfaces by which a first element and a second element, which has a relief on a surface, are pressed against one another to provide the second element with a microstructure by cold deformation.

Such a method can be used for manufacturing an optical medium, in particular a disc-shaped information carrier provided with one or more circular or spiral optically readable tracks. The first element may then be a master disc which can be used directly as a stamper. Such a stamper comprises a planar plastics substrate having an embossed information surface comprising raised portions (bumps) formed in an expansion layer and representing information bits. A retention layer overlies the expansion layer. When the method is carried out the stamper is positioned opposite a basic structure (second element) comprising an optically transparent plastics substrate with a non-cured or incompletely cured layer carrying a light-reflecting layer, generally of a metal. By means of pressure members the stamper is pressed against the basic structure to transfer the information present in the information-carrying surface of the stamper to the incompletely cured layer. Pressing may proceed until the incompletely cured layer has been cured by means of UV radiation. The pressure member acting against the stamper is made of steel and the pressure member supporting the basic structure is made of a UV-transmitting quartz.

A drawback of the method described above is that when the first and the second element are pressed against one another differences in radial extension between the elements and pressure members which are in contact with one another occur and depending on the prevailing friction give rise to shear stresses and/or stick-slip effects at the contact surfaces between the elements and the pressure members, thereby distorting the information during the information transfer.

SUMMARY OF THE INVENTION

It is an object of the invention to provide a method of the type defined in the opening paragraph, which mitigates the production of shear stresses at the facing contact surfaces of the substrates and the substrate contact surfaces facing the pressure members during the formation of the microstructure.

For this purpose the method in accordance with the invention is characterized in that during pressing use is made of a pressure body which is interposed between one of the pressure members and one of the elements and which is made of a material having a characteristic parameter equal to the quotient of the Poisson's ratio and the modulus of elasticity of the material, which parameter differs less from the corresponding parameter of the material of the relevant element than from the corresponding parameter of the material of the relevant pressure member, the difference between the parameter of the material of the first element and the parameter of the material of the second element being smaller than or equal to the difference between the parameter of the material of said pressure body and the parameter of the material of the adjacent element.

It is to be noted that the Poisson's ratio and the modulus of elasticity are defined, for example, in the book "Elements of Strength of Materials", fifth edition, 1968, pp. 9 to 11, by S. Timoshenko and D. H. Young, D. Van Nostrand Company, Inc.

If an object of a material is subjected to a stress this object will expand in three principal stress directions. In a frictionless situation a normal force exerted on a cylindrical or disc-shaped object will produce a radial extension $\epsilon$ [—] equal to $-(\nu/E) \times \sigma_z$, where
  $\nu$ = Poisson's ratio [—],
  $E$ = modulus of elasticity [N/m$^2$], and
  $\sigma$ = normal stress [N/m$^2$].
Regardless of the height or thickness of the object the radial displacement $\delta R$ [m] at a radius r [m] is:

$$-r \times (\nu/E) \times \sigma_z.$$

When objects having mutually different parameters ($\nu/E$) are loaded this results in mutually different radial extensions. The method in accordance with the invention provides steps to minimize differences in radial extension during pressing.

Very good results are obtained if the method in accordance with the invention is characterized in that, in addition, a similar pressure body is interposed between the other pressure member and the other element. Preferably, the pressure bodies have a cylindrical shape.

The desired microstructure can be formed perfectly by means of the method in accordance with the invention which is characterized in that the material of the pressure body is selected in such a way that the parameter is at least substantially equal to the parameter of the material of the adjacent element.

Figure 1:
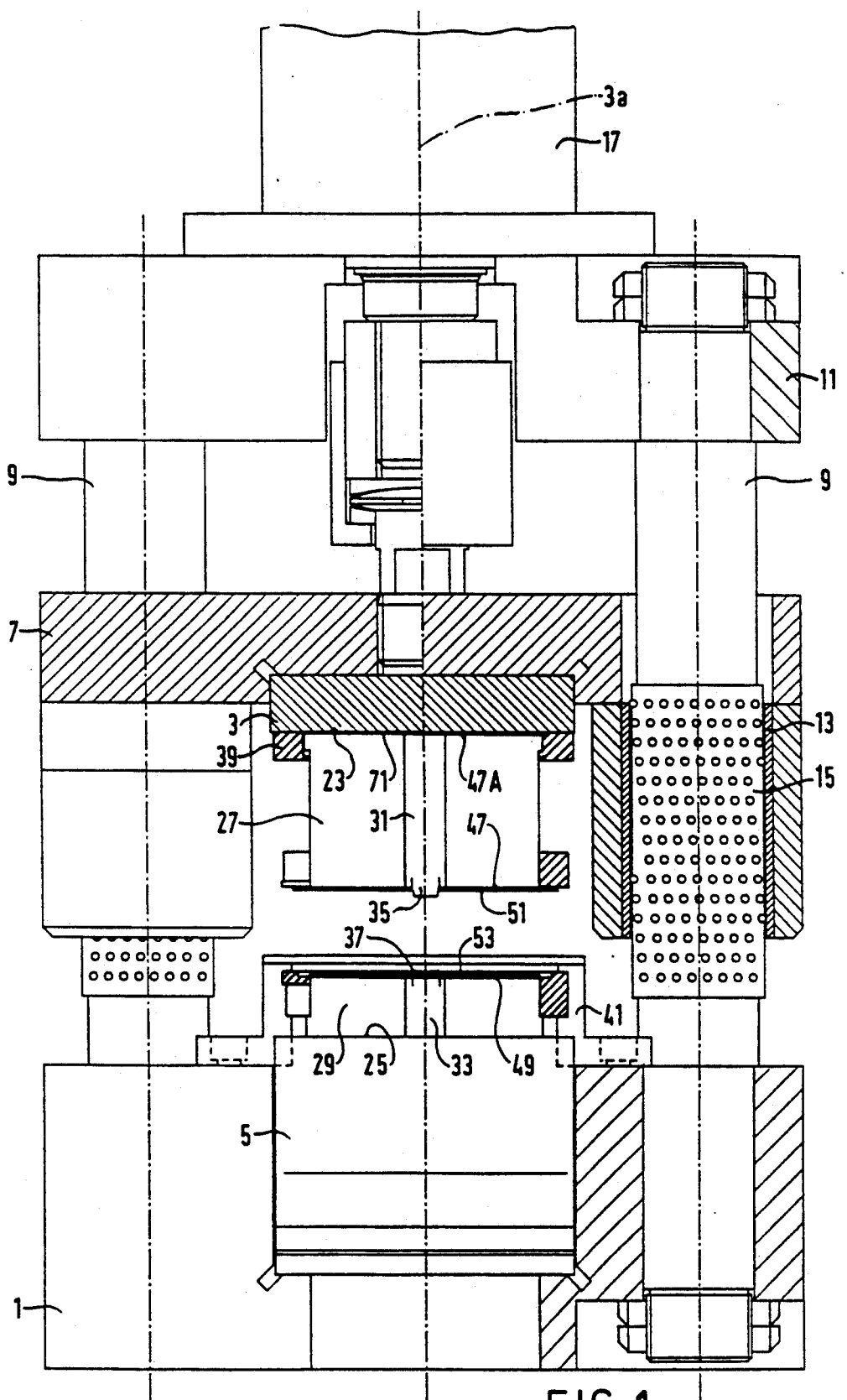
FIG. 1 is a sectional view of an embodiment of the arrangement in accordance with the invention.

A practical embodiment, in which both elements are made at least substantially from a plastic, is characterized in that the pressure member is or the pressure members are also made of a plastic.

The invention is very suitable for the fabrication of a disc-shaped information carrier from a substrate having a layer structure, which substrate may be formed from any currently employed substrate material such as polycarbonate, quartz and glass. For this purpose, in carrying out the inventive method, the first element is pressed against the disc-shaped second element comprising a substrate with a layer structure provided thereon, the relief on the surface of the first element comprising information bits in the form of bumps of variable length dimensions and the same width dimension. An information carrier thus manufactured can be used in an optical read-out system and can be read by means of a laser beam. Therefore, the invention aims in particular at a method of manufacturing plate-shaped media carrying coded information which, via reflected optical signals, can be converted into electrical signals for use in, for example, audio and/or video read systems or data read systems.

An embodiment of the method in accordance with the invention, in which the object is a disc-shaped information carrier and both elements comprise a polycarbonate substrate, is characterized in that the pressure member is made of a polycarbonate.

The method in accordance with the invention is very suitable for the replication of a CD master to an optically readable information carrier. It is to be noted that Liempd et al., U.S. Pat. No. 5,214,632; herewith incorporated by reference) describes a master suitable for direct-effect mastering. The first element may then be a dimensionally stable flat first substrate carrying an expansion layer provided with raised portions (bumps) and a retention layer, in particular a non-elastic polymer layer. In such a disc-shaped element (master/stamper) the bumps, which are arranged in a spiral track, represent the information. The second element may be an optically transparent dimensionally stable second substrate with a multi-layer structure, the multi-layer structure comprising a soft plastics layer, for example a curable polymer layer. When the method in accordance with the invention is carried out the soft layer is formed with pits corresponding to the bumps. After complete curing of said soft layer the first and the second layer are separated from one another by a displacement of the pressure bodies relative to each other. The presence of a light-reflecting layer, in particular a metal layer, enables the information to be optically read by means of the method in accordance with the invention. The second element is finished as an information carrier after application of a protective coating.

The invention further relates to an arrangement for carrying the method in accordance with the invention.

The arrangement in accordance with the invention comprises two pressure members having pressure surfaces facing one another, the pressure members being movable relative to each other in directions of movement transverse to the pressure surfaces. The arrangement in accordance with the invention is characterized in that to the pressure surface of at least one of the pressure members a pressure body is secured, which pressure body has a contact surface for cooperation with an element, the pressure body being made of a material having a characteristic parameter equal to the quotient of the Poisson's ratio and the modulus of elasticity of the material, which parameter differs less from the corresponding parameter of the material of the relevant element than from the corresponding parameter of the material of the relevant pressure member. Such an arrangement enables two elements to be pressed against one another without the introduction of shear stresses at the contact surface between the two elements and at the contact surface between an element and a pressure member. Preferably, a pressure member is provided at both pressure surfaces of the arrangement.

An optimum performance is achieved by means of the arrangement which is characterized in that the parameter of the material of the pressure body is at least substantially equal to the parameter of the element adjoining the pressure body in operation.

An embodiment of the arrangement in accordance with the invention which is particularly suitable for pressing elements provided with plastics substrates is characterized in that the material of the pressure member is a plastic.

An embodiment of the arrangement in accordance with the invention which is particularly suitable for manufacturing disc-shaped optical information carriers having a polycarbonate base, employing a master disc suitable for use as a stamper and having a polycarbonate substrate, is characterized in that the material of the pressure member is a polycarbonate. Preferably, the material of the pressure member is transparent to UV radiation for the purpose of curing a photo-polymer layer of the information carrier to be formed.

In order to prevent air from being trapped between the elements while carrying out the inventive method an embodiment of the arrangement in accordance with the invention is characterized in that the contact surface of the pressure member has a conical or convex shape. In order to avoid undesirable axial stresses in the arrangement in the case of a conical contact surface the contact surface should be disposed at an angle of maximum two milliradians relative to a plane which is oriented transversely of the directions of movement of the pressure members. It has been found that an angle of one milliradian yields favourable results. Moreover, axial stresses are minimized by forming the pressure body with a conical or convex contact surface facing the pressing surface of the adjacent pressure member.

An embodiment of the arrangement in accordance with the invention is characterized in that the cylindrical pressure body is secured to the adjacent pressure member so as to allow radial extension. This counteracts undesirable radial stresses in the pressure body when loaded. A practical embodiment, which enables an adequate radial extension to be obtained, is characterized in that the cylindrical pressure body is secured to the adjacent pressure member so as to allow radial extension.

The invention will now be described in more detail, by way of example, with reference to the drawings.

The arrangement in accordance with the invention shown in FIG. 1 comprises a frame plate 1 and two pressure members 3 of hardened steel and 5 of quartz which are movable relative to one another. In the present example the quartz pressure member 5 is fixedly secured to the frame plate 1 and the hardened steel pressure member 3 is movable along an axis of movement 3a. The pressure member 3 is secured to a pressure member slide 7, which is axially movable along guide posts 9 which extend parallel to the axis 3a and which are secured to the frame plate 1 at one end and to a frame plate 11 at the other end. The slide 7 is supported by means of hardened steel sleeves 13 and bronze bearing bushes 15 with balls. The pressure member 3 is driven by hydraulic means 17 which are know per se and which are not described in more detail.

The pressure members 3 and 5 each have a pressure member surface 23 and 25 respectively to which pressure bodies 27 and 29 are secured. The two pressure bodies 27 and 29 have a center hole 31 and 33 respectively, engaged by a centering mandrel 35 and 37 respectively. The pressure body 27 is secured to the steel pressure member 3 by means of a fixing ring 39. The pressure body 29 is secured to the pressure member 5 by fixing means 41 and, like the quartz pressure member 5, it is transparent to UV radiation.

Both pressure bodies 27 and 29 have a contact surface 47 and 49 respectively for cooperation with a first element 51 and a second element 53 respectively. By selecting at least substantially the same material for the pressure bodies 27 and 29 and for the elements 51 and 53 it is achieved that there are no or only small insignificant differences between the ratios defined by the quotient of the Poisson's ratio and the elasticity modulus.

Figure 2:
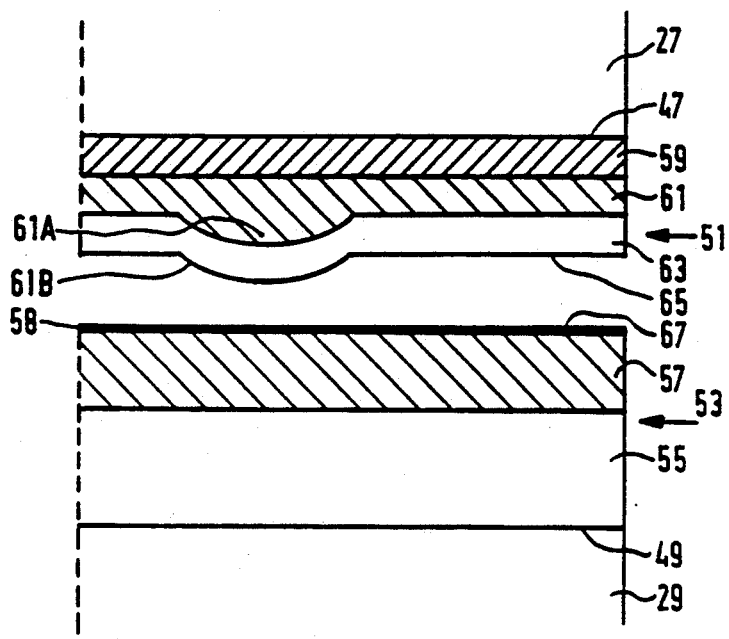
FIG. 2 shows diagrammatically an embodiment of a first and a second element arranged between the pressure bodies of the arrangement shown in FIG. 1.
Figure 3:
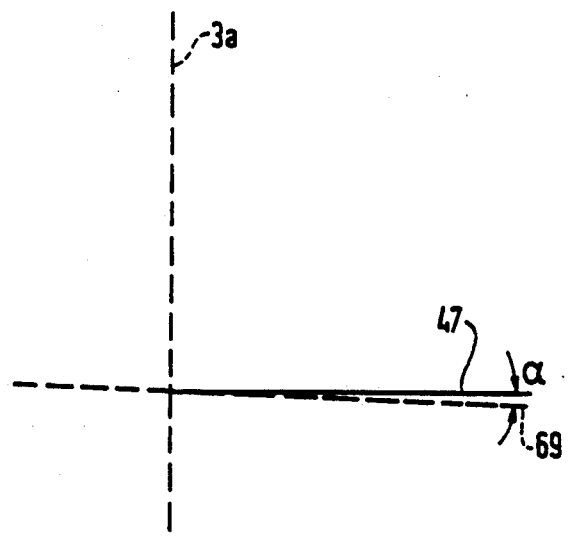
FIG. 3 shows diagrammatically the orientation of a contact surface of a pressure body of the arrangement shown in FIG. 1.

The arrangement in accordance with the invention is intended and suitable in particular for the fabrication of optically readable information carriers carrying information in circular or semi-circular tracks. Such an information carrier can be manufactured from the second element 53 by means of the method in accordance with the invention. The second element 53 and subsequently the first element 51 will be described comprehensively with reference to FIG. 2.

The second element 53 comprises a substrate 55 of a UV-transmitting polycarbonate resting on the contact surface 49 and provided with a soft photo-curable layer 57, for example a polymer layer. The layer 57 carries a metal layer 58 of for example Ag. The first element 51 comprises a polycarbonate substrate 59 which contacts the contact surface 47 and which carries an expansion layer 61 formed with bumps 61A representing information bits and a retention layer 63. The first element 51 thus formed is a so-called direct-effect stamper (DES) having an information-containing surface 65. The thickness of the substrates is usually a few millimetres and the thickness of the layer or layer structure formed thereon is only a few microns. Both substrates 55 and 59 are disc-shaped and have the same diameter. The defined characteristic parameters of the materials of both substrates are the same.

When the method in accordance with the invention is carried out the two cylindrical pressure bodies 27 and 29 are moved towards one another along the axis 3a, causing the two elements 51 and 53 to be pressed against one another. The curable layer 57 and the metal layer 58 near the surface 67 are then subjected to cold deformation by the bumps 61B on the surface 65 for the transfer of information and the formation of the information tracks. By means of a radiation source, not shown, the layer 57 is cured, after which by a displacement of the pressure member 3 with the pressure body 27 the first element 51 is removed from the second element 53 by a displacement of the pressure member 3 with the pressure body 27. It is also possible to separate the first element 51 and the second element 53 from one another before the layer 57 is cured. The metal layer 58 of a second element 53 formed with a microstructure by means of the method in accordance with the invention, also referred to as a direct-effect replica (DER), serves as a reflective layer for optically reading the formed information track by means of a laser beam, which track is generally spiral-shaped or made up of concentric circles. The information carrier thus formed may also be provided with a protective coating. If desired, the reflective layer may be applied after the cold deformation of the layer 57.

In order to preclude the production of undesired stresses in the pressure bodies 27 and 29 at least one of the pressure bodies, in the present example the pressure body 27, is given a conical contact surface 47 which is inclined at an angle α of 1 milliradian relative to a plane 69 which is oriented transversely of the axis 3a. For the same reason the surface 47A facing the pressing surface 23 of the pressure member 3 may also be conical. It has been found that for said angle the pressure bodies preferably have a height greater than 20 mm.

In order to allow radial extension of the pressure body 27 relative to the pressure member 3 a thin layer of a tetrafluoroethylene polymer sold under the trademark TEFLON Teflon by E. I. Dupont de Nemours & Co. layer 71 is interposed between the contact surface 47A of the pressure body 27 and the pressure surface 23 of the pressure member 3.

Obviously, the invention is not limited to the embodiment shown herein. For example, it is possible to adapt the defined parameter of only one of the pressure bodies to the parameter of the first and the second elements. Moreover, it will not always be necessary to provide a pressure body with a conical or convex contact surface.

It is to be noted also that depending on the material of the elements or substrates thereof the pressure bodies may be made of a material other than a polycarbonate, such as quartz or glass or another plastic, for example polymethylmethacrylate. Moreover, it is to be noted that for reasons of symmetry it may be important to give the pressure bodies 27 and 29 the same height.

We claim:

1. In an apparatus for manufacturing an object having a surface structure by pressing a first element which has a relief on a surface against a second element to provide the second element with a microstructure by cold deformation said apparatus comprising said first element and two pressure members having pressure surfaces facing each other and opposing said elements, the pressure members being movable relative to each other in directions of movement transverse to the pressure surfaces, the improvement wherein a pressure body is secured to the pressure surface of at least one of the pressure members, said pressure body having a contact surface for cooperation with one of the elements and said pressure body being made of a material whose quotient of its Poisson's ratio to its modulus of elasticity differs less from the corresponding quotient of the material of the element cooperating with said contact surface in operation than from the corresponding quotient of the material of the pressure member to which the pressure body is secured.

2. An apparatus as claimed in claim 1, wherein, in addition, a similar pressure body is secured to the other pressure surface.

3. An apparatus as claimed in claim 1 wherein the quotient of the material of the pressure body is at least substantially equal to the quotient of the material of the element cooperating with the contact surface in operation.

4. An apparatus as claimed in claim 1, wherein the material of the pressure body is plastic.

5. An apparatus as claimed in claim 4, wherein the plastic is a polycarbonate.

6. An apparatus as claimed in claim 4 or 5, wherein the plastic is transparent to UV radiation.

7. An apparatus as claimed in claim 1, wherein the contact surface of the pressure body is conical or convex.

8. An apparatus as claimed in claim 7, wherein the contact surface of the pressure body is conical and is disposed at a maximum angle of two milliradians relative to a plane which is oriented transversely to the directions of movement.

9. An apparatus as claimed in claim 8, wherein said angle is 1 milliradian.

10. An apparatus as claimed in claim 7, wherein the pressure body has a conical or convex contact surface facing the pressure surface of the pressure member to which it is secured.

11. An apparatus as claimed in claim 1, wherein the pressure body is cylindrical and is secured to a pressure member in a manner so as to allow radial extension.

12. An apparatus as claimed in claim 11, wherein the pressure surface of the pressure member is provided with a tetrafluoroethylene polymer layer which extends between the pressure member and the pressure body.

* * * * *